May 13, 1930.  A. BAUCHERE ET AL  1,758,778
KILN FOR THE MANUFACTURE OF FUSED CEMENT
Filed March 26, 1925
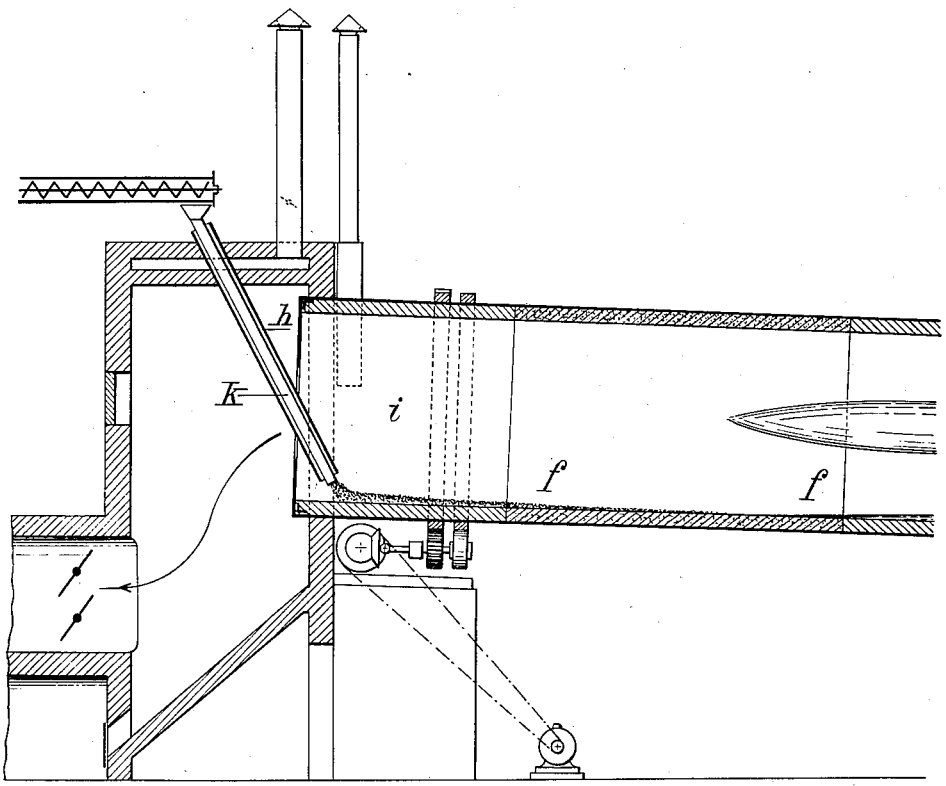
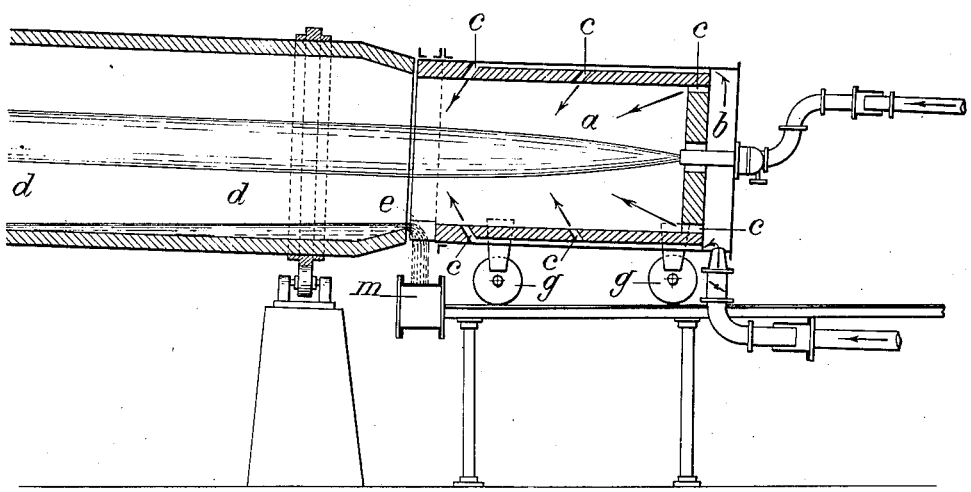

Patented May 13, 1930

1,758,778

UNITED STATES PATENT OFFICE

ANTOINE BAUCHÈRE AND GABRIEL ARNOU, OF PARIS, FRANCE

KILN FOR THE MANUFACTURE OF FUSED CEMENT

Application filed March 26, 1925, Serial No. 18,598, and in France April 9, 1924.

This invention relates more particularly to an apparatus for the manufacture of fused cement.

The manufacture of fused cement has hitherto been accomplished in an electric kiln or in a water jacketed kiln.

The first named method of manufacture is only economically possible in particular cases and the second requires as fuel coke which is expensive and often difficult to procure.

The water jacketed kiln also operates as a gas generator with a large production of carbon monoxide which reduces the calorific effect of the combustible employed and further reduces the economic benefit of this process.

The use of a rotary kiln for the manufacture of fused cement has considerable advantages over other processes because it permits the use as a combustible of any coal after being suitably pulverized, or of natural gas, or of generator gas, or petroleum oil or the like.

The combustible is completely utilized because its combustion is carried out in this kiln to produce carbon dioxide and not carbon monoxide, and finally the quality of the cement is constant owing to the homogeneity of the substance obtained through the rotation of the kiln.

Attempts to carry out the manufacture of fused cement by means of a rotary kiln have hitherto met with only a limited amount of success because the existing rotary kiln designed for clinkering Portland cement have been employed without modification and the continuance of the process is rendered impossible after a few hours by many obstacles, particularly by the formation at the discharge end of the kiln of solid rings preventing the flow of cement and in the advance end of the kiln of heaps or rings which obstruct the feeding of the raw material.

The object of the present invention is to provide an apparatus enabling these disadvantages to be overcome and the industrial manufacture of fused cement to be accomplished in a rotary kiln.

In accordance with this invention, the material intended for instance for making fused aluminous cement is treated in the following manner:

It is brought into the upper end of the inclined rotary kiln where it is dehydrated and decarbonized and the temperature of the material is maintained at about 1000° C. during the whole of the decarbonization owing to the endothermicity of this reaction, although it is in a zone of flame of a higher temperature.

The fusion reaction does not commence here and the material before the end of the decarbonation period is then passed to a zone of intense heat wherein a temperature of 1600° C. to 1700° C. is maintained where it fuses suddenly as soon as the decarbonation is complete, the length of the kiln and the length of the flame being calculated and combined so that the temperature of the kiln in the zone where decarbonation terminates is considerably above the fusion point of the material treated.

Under these circumstances neither heaps nor rings can form in the fore part of the kiln with their accompanying disadvantages.

The fused material after having passed through a given length of the rotary kiln heated to a high temperature, where it is rendered homogeneous and where the reactions take place, is then discharged while still in a totally fused condition at a temperature of 1500° C. to 1600° C. and before it encounters the coldest region of the flame situated near the burner. In this way the lumps of material, which have hitherto prevented the industrial production of molten or fused cement in a rotary kiln, cannot be formed and a regular operation is obtained.

This process is preferably carried out in the apparatus hereinafter described and shown as an example and illustrated in longitudinal section in the accompanying drawing.

It is well known that the flame which serves for heating the rotary kiln has three characteristic zones.

1. A comparatively cool zone *a* near the injection nozzle of the combustible.

2. A somewhat extended hot zone *d* enabling the cement to be fused.

3. A point of maximum temperature at the end of the flame.

In conformity with this invention, these known properties of the flame of the burner generally employed are utilized in the following way:

The comparatively cool zone situated near the nozzle for injecting combustible, is formed as a fore-hearth and has air circulation which cools the brick lining and prevents the temperature rising sufficiently to injure it, while enabling hot air to be available for the combustion of the combustible discharged by the burner and thereby obtaining a particularly hot flame in the after kiln zone formed as the rotary part of the kiln. The aperture for discharging the cement is located at the joint between the non-rotary fore-hearth and the rotary part of the kiln, in order to prevent the material under fusion from entering a cooled zone prior to discharge.

The rotary part of the kiln comprises a comparatively cooler portion in the zone where the material before being entirely melted is liable to form rings or obstructions and for this purpose the rotary kiln at this place may be lined for a certain length with bricks having a high thermic conductivity.

The material is introduced into the kiln by means of a suitably cooled feeding device.

In the example particularly illustrated in the accompanying drawing, the fore hearth is made long enough to contain all the comparatively cool part of the flame. In order to prevent in this part of the kiln a rise of temperature which would be liable to injure the fireclay or firebrick lining which is not cooled by the fused material as in the fusion section *d* of the kiln proper and for heating the air for combustion and thus obtaining a higher temperature in the part of intense heat, the walls of the forekiln are suitably air cooled by the air admitted for combustion purposes, the air being correspondingly heated.

The fore kiln is provided for this object with a double casing *b* allowing the circulation of a current of air in the bottom and side walls of the fore kiln and this current of air passes through flues *c* in the bricks and cools the latter.

By regulating the admission of this air which is heated by radiation from the bricks, the length of the flame may be regulated and sufficient temperature obtained for the fusion of the cement in the zone situated at the lower end *d* of the revolving part.

The fore kiln is also provided with rollers *g* on which it can travel and be displaced and follow the expansion movement of the movable part of the kiln, because a fixed fore kiln without the possibility of being longitudinally displaced cannot meet industrial requirements.

This fore kiln is not formed with a so-called discharge hole, that is to say a hole for the discharge of liquid cement situated in its interior since this would tend to increase adhesions and cause stoppages in the movement of the kiln, but simply has a notched aperture *e* in the end thereof adjacent the movable part of the kiln enabling the discharge of the liquid cement to take place.

The stream of liquid cement falls freely through the air before being received for example in an endless conveyor, the end view of which is represented diagrammatically at *m*, and the cement thus undergoes an actual immersion in cold air which improves the quality of the cement. This is not the case when the molten product runs into a closed gullet or vessel where cooling is slow.

In order to prevent re-admission of air through the discharge slot, the operation is of course carried on under slight pressure in the kiln.

The upper end *f* of the kiln extending in front of the hottest part *d* may be made of materials of high thermic conductivity such as bricks of carborundum, fused alumina, and the like.

Further the materials are introduced into the kiln before dehydration and decarbonation and these two reactions being endothermic prevent the rise of temperature in the parts *i* and *f* of the kiln where it must not exceed 1000° C. It thus cannot produce deleterious lumps or adhesions because the materials in consequence of their incomplete decarbonation are still at a relatively low temperature when they enter the zone *d* where the temperature is too high to allow the heaps or lumps to form.

The mixture to be fired is introduced into the kiln by means of a chute *k* enclosed in a cooling jacket *h* which prevents the said chute from assuming too high a temperature under the highly heated fumes from the kiln. The combined arrangements in whole or in part ensure a regular working in the manufacture of fused cement and the general economy of the process.

A kiln which is designed to operate upon a cement obtained by a wet process is about 35 to 40 meters in length and of this entire length the first heating chamber in which the endothermic reaction takes place is about 20 to 30 meters in length, the chamber in which fusion takes place is about 5 to 10 meters in length and the fore hearth is from 3 to 6 meters in length. It is of course understood that these proportions can be varied considerably depending upon whether the cement is more or less damp and also depending upon the nature of the materials themselves which are used and the combustible.

Having now particularly described and ascertained the nature of our said invention and in what manner the same is to be performed, we declare that what we claim is:

1. Apparatus for making fused cement comprising an inclined rotary kiln, means for feeding the cement ingredients into the kiln at its upper end, the lower end of the kiln being open, a non-rotatable forehearth having an open end arranged close to the lower end of the rotary kiln, the latter having a discharge opening for liquefied fused cement at the joint between said rotary kiln and forehearth, a fuel nozzle entering said forehearth and directed longitudinally of said forehearth and kiln, the walls of said kiln being constructed of heat retaining material in a portion adjacent said forehearth and of heat dissipating material in the portion next removed from said forehearth, means for controlling the projection of a flame from said nozzle through said kiln so that the flame tip shall extend a slight distance into the chamber defined by the wall of heat dissipating material, said last named chamber being constructed of such length as to assure that the flame tip is in a region of endothermic reaction.

2. Apparatus for making fused cement comprising an inclined rotary kiln, means for feeding the cement ingredients into the kiln at its upper end, the lower end of the kiln being open, a non-rotatable forehearth having an open end arranged close to the lower end of the rotary kiln, the latter having a discharge opening for liquefied fused cement at the joint between said rotary kiln and forehearth, a fuel nozzle entering said forehearth and directed longitudinally of said forehearth and kiln, the walls of said kiln being constructed of heat retaining material in a portion adjacent said forehearth and of heat dissipating material in the portion next removed from said forehearth, means for controlling the projection of a flame from said nozzle through said kiln so that the flame tip shall extend a slight distance into the chamber defined by the wall of heat dissipating material, said last named chamber being constructed of such length that the endothermic reaction shall extend slightly beyond said chamber and into the advance end of the chamber defined by the wall of heat retaining material.

3. Apparatus as claimed in claim 1, the wall of heat dissipating material being constituted by carborundum bricks.

In testimony whereof we have signed our names to this specification.

ANTOINE BAUCHÈRE.
GABRIEL ARNOU.